United States Patent
Honjo et al.

(10) Patent No.: US 12,211,322 B2
(45) Date of Patent: Jan. 28, 2025

(54) VEHICLE CONTROL DEVICE AND VEHICLE CONTROL SYSTEM

(71) Applicant: AISIN CORPORATION, Aichi (JP)

(72) Inventors: Yutaro Honjo, Kariya (JP); Ichiji Yamada, Kariya (JP)

(73) Assignee: AISIN CORPORATION, Aichi (JP)

(*) Notice: Subject to any disclaimer, the term of this patent is extended or adjusted under 35 U.S.C. 154(b) by 206 days.

(21) Appl. No.: 17/733,097

(22) Filed: Apr. 29, 2022

(65) Prior Publication Data

US 2022/0366731 A1 Nov. 17, 2022

(30) Foreign Application Priority Data

May 13, 2021 (JP) ................................ 2021-081911

(51) Int. Cl.
*G07C 5/00* (2006.01)
*B60G 17/015* (2006.01)
*G06Q 20/14* (2012.01)

(52) U.S. Cl.
CPC ............. *G07C 5/008* (2013.01); *G06Q 20/14* (2013.01); *B60G 17/015* (2013.01); *B60G 2400/202* (2013.01)

(58) Field of Classification Search
None
See application file for complete search history.

(56) References Cited

U.S. PATENT DOCUMENTS

| | | | |
|---|---|---|---|
| 2010/0253018 A1 | 10/2010 | Peterson | |
| 2014/0039999 A1* | 2/2014 | Levene | G06Q 20/14 |
| | | | 705/16 |
| 2015/0142485 A1* | 5/2015 | Kiyama | G08G 1/0141 |
| | | | 705/7.11 |
| 2019/0180528 A1* | 6/2019 | Hall | G07C 5/008 |

(Continued)

FOREIGN PATENT DOCUMENTS

| | | |
|---|---|---|
| JP | 2005-112160 A | 4/2005 |
| JP | 2007026445 A | 2/2007 |

(Continued)

*Primary Examiner* — Hunter B Lonsberry
*Assistant Examiner* — Robert L Pinkerton
(74) *Attorney, Agent, or Firm* — BUCHANAN INGERSOLL & ROONEY PC (57) ABSTRACT

A vehicle control device includes an acquisition unit configured to acquire detection information in a current traveling state and position information indicating a current position of a vehicle, a transmission unit configured to transmit traveling information in which the detection information and the position information are associated with each other to an external management device, a reception unit configured to receive changed specification information of the vehicle transmitted when the management device determines that specifications of the vehicle need to be changed, and a control unit configured to change the specifications of the vehicle corresponding to the specification information and reflect the changed specifications in traveling control. The specification information includes specifications changed based on comparison between first traveling information that (Continued)

| CHANGE FACTOR | INPUT ACCELERATION CHANGE EXAMPLE | | INFLUENCE FACTOR |
|---|---|---|---|
| SPRUNG WEIGHT | | | OCCUPANT AND LOADING STATE ⋮ |
| SUSPENSION CHARACTERISTIC | | | CHANGE IN TEMPERATURE (ATTENUATION FORCE CHARACTERISTIC) CHANGE IN SLIDING CHARACTERISTIC DETERIORATION OF ABSORBER DETERIORATION OF BUSH ⋮ |
| UNSPRUNG WEIGHT | | | REPLACEMENT OF TIRE REPLACEMENT OF WHEEL ⋮ |
| TIRE CHARACTERISTIC | | | REPLACEMENT OF TIRE CHANGE IN TIRE AIR PRESSURE DETERIORATION OF BUSH ⋮ | is current traveling information of the vehicle and second traveling information obtained when the vehicle has previously traveled at a same position.

7 Claims, 7 Drawing Sheets

(56) References Cited

U.S. PATENT DOCUMENTS

| | | | |
|---|---|---|---|
| 2019/0250612 A1 | 8/2019 | Yamamuro et al. | |
| 2021/0124088 A1* | 4/2021 | Hattori | G01C 21/3461 |
| 2021/0199462 A1* | 7/2021 | Namba | G01C 21/3848 |
| 2021/0204188 A1* | 7/2021 | Oyama | H04W 84/005 |
| 2022/0185052 A1* | 6/2022 | Kanda | B60G 17/0165 |
| 2022/0314729 A1* | 10/2022 | Isshiki | B60G 17/01908 |
| 2024/0300523 A1* | 9/2024 | Gabriel | B60W 30/0953 |

FOREIGN PATENT DOCUMENTS

| | | |
|---|---|---|
| JP | 2008114666 A | 5/2008 |
| JP | 2010241422 A | 10/2010 |
| JP | 5855974 B2 | 12/2015 |
| JP | 2019137356 A | 8/2019 |
| JP | 2019-160085 A | 9/2019 |
| JP | 2019-209737 A | 12/2019 |
| WO | 2020195113 A1 | 10/2020 |

* cited by examiner

| CHANGE FACTOR | INPUT ACCELERATION CHANGE EXAMPLE | INFLUENCE FACTOR |
|---|---|---|
| SPRUNG WEIGHT | (graph: M2 UP / M2 DOWN) | OCCUPANT AND LOADING STATE ... |
| SUSPENSION CHARACTERISTIC | (graph: Ks UP / Ks DOWN; Cs DOWN / Cs UP / Cs UP / Cs DOWN / Cs UP / Cs DOWN) | CHANGE IN TEMPERATURE (ATTENUATION FORCE CHARACTERISTIC) CHANGE IN SLIDING CHARACTERISTIC DETERIORATION OF ABSORBER DETERIORATION OF BUSH ... |
| UNSPRUNG WEIGHT | (graph: M1 UP / M1 DOWN) | REPLACEMENT OF TIRE REPLACEMENT OF WHEEL ... |
| TIRE CHARACTERISTIC | (graph: Kt UP / Kt DOWN) | REPLACEMENT OF TIRE CHANGE IN TIRE AIR PRESSURE DETERIORATION OF BUSH ... |

VEHICLE CONTROL DEVICE AND VEHICLE CONTROL SYSTEM

CROSS REFERENCE TO RELATED APPLICATIONS

This application is based on and claims priority under 35 U.S.C. § 119 to Japanese Patent Application 2021-081911, filed on May 13, 2021, the entire content of which is incorporated herein by reference.

TECHNICAL FIELD

Embodiments of this disclosure relate to a vehicle control device and a vehicle control system.

BACKGROUND DISCUSSION

In related art, in order to make a vehicle travel more comfortably, there has been a vehicle control device that detects a behavior of a host vehicle during traveling by using various sensors mounted on the host vehicle and appropriately reflects the detected behavior in traveling control. For example, there has been a suspension control device that improves vibration damping property by changing an attenuation coefficient or the like of a suspension according to a road surface state. In vehicles equipped with such a suspension control device, there has been proposed a technique of communicating with an external server, acquiring traveling information of another vehicle traveling in the same road section, and applying the traveling information of the other vehicle to suspension control of the host vehicle, thereby improving the vibration damping property of the host vehicle while reducing a calculation processing load in the host vehicle.

Examples of the related art include JP-A-2019-137356 (Reference 1).

However, the related art calculates a control target value such as the attenuation coefficient of the host vehicle using the traveling information acquired when the other vehicle different from the host vehicle travels on the same road section. Therefore, there is a problem that even if the control target value such as the attenuation coefficient calculated based on the traveling information of the other vehicle is applied to the host vehicle having different vehicle specifications, it is difficult to obtain a control result (for example, a vibration damping performance) expected in the host vehicle. Further, the vehicle specifications of the host vehicle used to calculate the control target value are generally calculated by using specifications set at a time of design of the vehicle or the like, but the specifications may be changed depending on a use state of the host vehicle, or changed intentionally. In such a case as well, it may be difficult to obtain the expected control result.

A need thus exists for a vehicle control device and a vehicle control system which are not susceptible to the drawback mentioned above.

SUMMARY

According to an aspect of this disclosure, a vehicle control device includes, for example: an acquisition unit configured to acquire detection information in a current traveling state detected by a detection unit mounted on a vehicle provided with the vehicle control device and position information indicating a current position of the vehicle; a transmission unit configured to transmit traveling information in which the acquired detection information and the acquired position information are associated with each other to an external management device; a reception unit configured to receive changed specification information of the vehicle that is transmitted when the management device determines that specifications of the vehicle that affect traveling control of the vehicle need to be changed with respect to the current traveling state of the vehicle; and a control unit configured to, when the specification information is received, change the specifications of the vehicle corresponding to the specification information and reflect the changed specifications in the traveling control of the vehicle. The specification information includes specifications that are changed based on comparison between first traveling information that is current traveling information of the vehicle and second traveling information obtained when the vehicle has previously traveled at a same position, accumulated in the management device, and corresponding to the first traveling information.

According to another aspect of this disclosure, a vehicle control system includes, for example: a vehicle control device configured to be provided in a vehicle and manage specifications used for traveling control of the vehicle in a changeable manner; and a management device configured to be provided outside the vehicle, transmit and receive information to and from the vehicle, accumulate the information acquired from the vehicle, and manage the specifications of the vehicle based on the information. The vehicle control device includes: an acquisition unit configured to acquire detection information in a current traveling state detected by a detection unit mounted on the vehicle and position information indicating a current position of the vehicle; a transmission unit configured to transmit traveling information in which the acquired detection information and the acquired position information are associated with each other to the management device; a reception unit configured to receive changed specification information of the vehicle that is transmitted when the management device determines that the specifications of the vehicle that affects the traveling control of the vehicle need to be changed with respect to the current traveling state of the vehicle; and a control unit configured to, when the specification information is received, change the specifications of the vehicle corresponding to the specification information and reflect the changed specifications in the traveling control of the vehicle The management device includes: a reception unit configured to receive the traveling information transmitted from the vehicle; a data accumulation unit configured to accumulate the received traveling information; a changed specification calculation unit configured to calculate specifications that are changed based on comparison between first traveling information that is current traveling information of the vehicle and second traveling information obtained when the vehicle has previously traveled at a same position, accumulated in the management device, and corresponding to the first traveling information; and a transmission unit configured to transmit the changed specification information of the vehicle to the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments disclosed here will be disclosed. Configurations of the embodiments to be described later and actions, results, and effects provided by the configuration are examples. This disclosure can be implemented by configurations other than those disclosed in the following embodiments, and can obtain at least one of various effects based on the basic configuration and derived effects.

Figure 1:
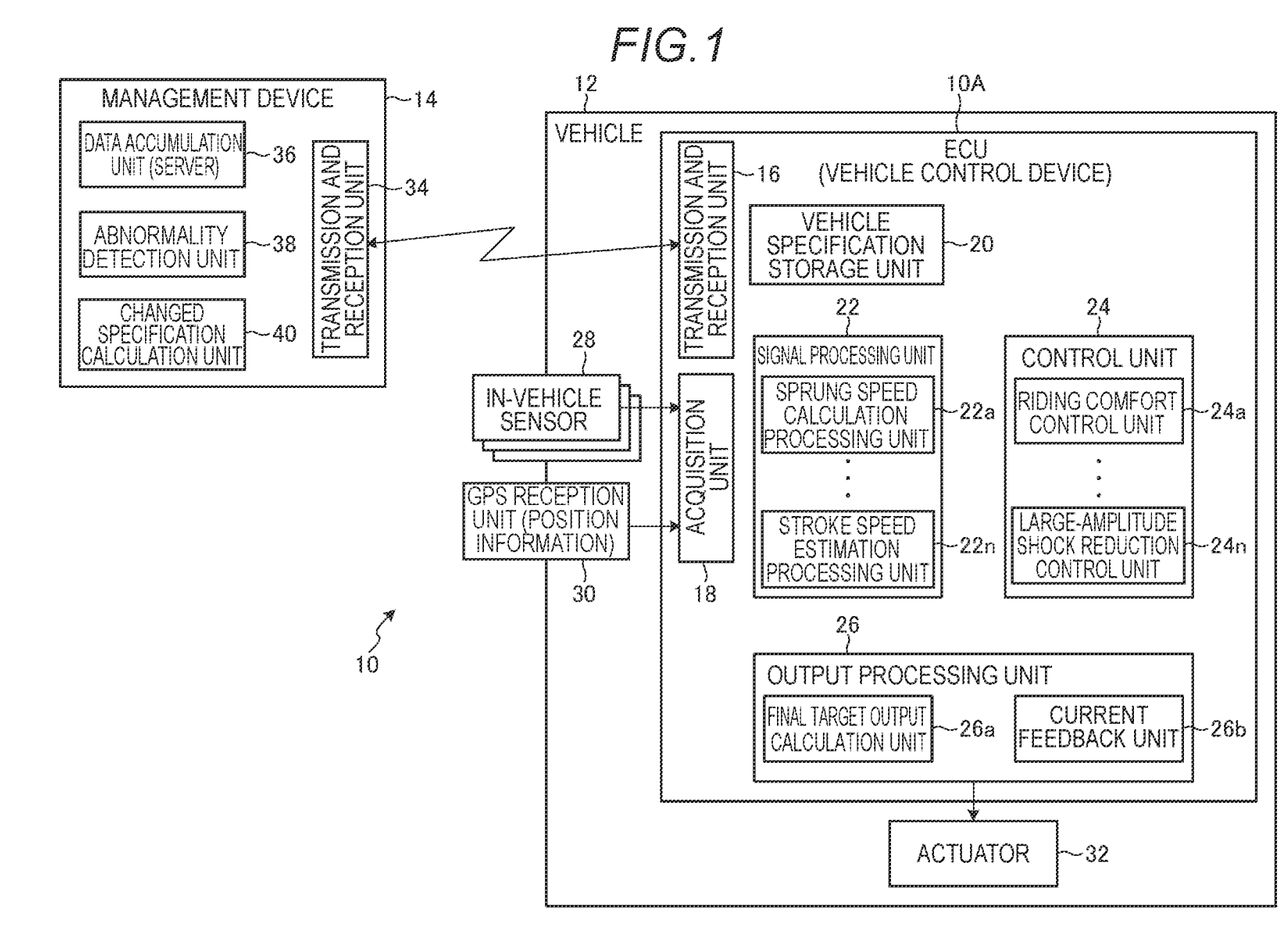
FIG. 1 is an exemplary and schematic block diagram showing a configuration of a vehicle control system (a vehicle control device) according to an embodiment.

FIG. 1 is an exemplary and schematic block diagram showing a configuration of a vehicle control system 10 (a vehicle control device 10A) according to an embodiment.

The vehicle control system 10 includes the vehicle control device 10A mounted on a host vehicle 12 and a management device 14 installed in an external management center or the like. In the present embodiment, a case where an electronic control suspension device mounted on the host vehicle 12 is controlled by the vehicle control device 10A will be described as an example. The electronic control suspension device calculates a target control amount according to a condition of a road surface on which a vehicle travels and prevents vibration to improve a riding comfort of the vehicle. Therefore, the case of FIG. 1 shows a case where the vehicle control device 10A is a suspension control electronic control unit (ECU).

In the electronic control suspension, information used for calculating the target control amount is roughly classified into a detection signal in which a behavior of the host vehicle 12 that changes according to the condition (unevenness or the like) of the road surface is collected in real time using an in-vehicle sensor, and a control constant (a constant based on standard specifications determined in a design stage) determined in vehicle development (adaptation). A value of the control constant or the standard specifications used for calculating the target control amount is not changed after the vehicle is handed over to a user, but various specifications including a loading condition may be changed in an actual vehicle, which causes a situation that the target control amount derived by calculation is not necessarily the target value. In addition to the standard specifications of the vehicle that are physically determined, the control constant includes an identification constant that is set to match a difference between a vehicle state quantity obtained by a physical formula and an actual vehicle state quantity.

As described above, the specifications (the standard specifications) determined at the time of design are not generally changed after the vehicle is handed over to the user, but the number of occupants or the amount of luggage changes depending on a use state of the host vehicle 12. That is, a weight of the vehicle changes. In addition, the specifications may change due to wear of a component of a suspension (for example, a spring and a bush) accompanying traveling, or may change due to, for example, replacement of summer tires and winter tires and replacement of a spring of the suspension. On the other hand, the detection signal collected in real time by the in-vehicle sensor changes according to a road surface state on which the vehicle travels (unevenness, friction coefficient of the road surface, and the like), a vehicle speed, and the like. Therefore, when the target control amount of the electronic control suspension device does not reach the target value (for example, when vibration cannot be sufficiently prevented), it may be difficult to determine whether the cause is a change in the detection signal (a change in the road surface state, a change in the vehicle speed, and the like) or a change in the control constant (the standard specifications) (replacement, wear, and the like).

When the host vehicle 12 travels on the same road surface (a road having the same road surface condition) at the same speed, a detection result detected by the in-vehicle sensor is substantially the same. Therefore, the vehicle control system 10 according to the present embodiment detects a traveling state of the host vehicle 12 when the host vehicle 12 travels under the same condition, for example, when the host vehicle 12 travels on the same road at the same speed. For example, in a case where the host vehicle 12 is a personally owned vehicle, a storage location thereof is often at home. In this case, a road surface condition (pavement and unevenness of a road surface, the presence or absence of a manhole, the presence or absence of a joint of the road, and the like) of a road around the home can be regarded as substantially the same regardless of a traveling timing. In addition, when the host vehicle 12 travels on the road, a speed limit is hardly changed, and although a traffic condition (degree of congestion) differs depending on a time zone, it can be considered that the traffic condition is almost the same in the same time zone. Therefore, the host vehicle 12 can be regarded as traveling in substantially the same traveling state if a traveling position (traveling road) is the same around the home.

At this time, when the traveling state has changed as compared with a past traveling state, it can be estimated that the traveling state has changed due to a change in the control constant (the standard specifications). In this case, the riding comfort of the host vehicle 12 may have changed, and it can be determined that the control constant needs to be corrected when the target control value of the electronic control suspension device is calculated. That is, in the case of the vehicle control system 10 according to the present embodiment, the control constant (a constant based on the standard specifications) determined at a time of development (design) of the vehicle, which has been previously used as a fixed value, is changed according to the traveling state of the host vehicle 12. As a result, the target control value suitable for a current traveling state can be calculated, and more appropriate control can be implemented.

Hereinafter, a configuration of the vehicle control device 10A according to the present embodiment, which changes the control constant (the specification information that is the fixed value, in the related art) according to the traveling state of the host vehicle 12, will be described in detail.

The vehicle control device 10A according to the present embodiment transmits traveling information in which detection information in the traveling state acquired during traveling of the host vehicle 12 and position information when the detection information is acquired are associated with each other to the management device 14. Further, the management device 14 sequentially accumulates the transmitted current traveling information, and constructs a dedicated database showing a state of the vehicle when the host vehicle 12 is traveling. In this case, the traveling information to be transmitted includes information in a case where the host vehicle 12 travels on a road satisfying a certain condition, that is, the above-described "usually passing road", for example, the road around the home.

The vehicle control device 10A includes a central processing unit (CPU), and a storage device (storage unit) such as a read only memory (ROM), a random access memory (RAM), and a solid state drive (SSD, flash memory). For example, the CPU reads a program installed and stored in a nonvolatile storage device such as the ROM, determines the target control amount of the electronic control suspension device by executing a calculation processing according to the program, and controls the electronic control suspension device of each wheel based on the control amount.

The vehicle control device 10A includes, for example, a transmission and reception unit 16, an acquisition unit 18, a vehicle specification storage unit 20, a signal processing unit 22, a control unit 24, and an output processing unit 26. All or some of the transmission and reception unit 16, the acquisition unit 18, the signal processing unit 22, the control unit 24, the output processing unit 26, and the like may be operated by a functional module implemented by reading the program stored in the ROM or the like into the CPU and executing the program, and may be implemented individually as hardware. The vehicle specification storage unit 20 may be implemented by a rewritable SSD or a hard disk drive (HDD). The vehicle specification storage unit 20 may be provided separately from the vehicle control device 10A.

The management device 14 installed in the external management center or the like can be a general personal computer, and includes, for example, a transmission and reception unit 34, a data accumulation unit 36 (server), an abnormality detection unit 38, and a changed specification calculation unit 40.

The transmission and reception unit 16 of the vehicle control device 10A communicates with the transmission and reception unit 34 provided in the management device 14 to transmit and receive various information. The transmission and reception unit 16 of the vehicle control device 10A and the transmission and reception unit 34 of the management device 14 may be provided as separate transmission units and reception units.

The transmission and reception unit 16 processes the detection signal (information acquired by an in-vehicle sensor 28 and a GPS reception unit 30) acquired by the acquisition unit 18 by the signal processing unit 22 and transmits the detection signal to the management device 14 side as the traveling information. In addition, the transmission and reception unit 16 can receive the changed specification information of the host vehicle 12 that is transmitted when the management device 14 determines that the specifications of the host vehicle 12 that affect traveling control of the host vehicle 12 need to be changed with respect to the current traveling state of the host vehicle 12.

The acquisition unit 18 acquires, for example, the detection information (for example, acceleration information) in the current traveling state detected by the in-vehicle sensor 28 (a detection unit) mounted on the host vehicle 12 and the position information indicating a current position of the host vehicle 12 acquired by the GPS reception unit 30. The in-vehicle sensor 28 is, for example, an acceleration sensor provided in the electronic control suspension device, a wheel speed sensor provided in each tire (wheel), and the like. In addition, the GPS reception unit 30 may be provided as a dedicated reception unit for the vehicle control system 10, or may acquire a GPS signal from a navigation system. In this case, the acquisition unit 18 may acquire the GPS signal (the position information) directly from the navigation system. The signal processing unit 22 generates the traveling information of the host vehicle 12 in which the detection information and the position information are associated with each other, and provides the traveling information to the transmission and reception unit 16. The transmission and reception unit 16 transmits the traveling information generated by the signal processing unit 22 to the transmission and reception unit 34 on the management device 14 side. The acquisition unit 18 may store the current traveling information of the host vehicle 12 in the RAM, the SSD, and the like as a traveling history.

The vehicle specification storage unit 20 stores the specifications (the standard specifications) determined at the time of development (design) of the host vehicle 12 in an updatable (overwritable) manner. When the specification information (changed specifications) calculated when the management device 14 determines that the specifications of the host vehicle 12 need to be changed with respect to the current traveling state of the host vehicle 12 is acquired via the transmission and reception unit 16, the vehicle specification storage unit 20 updates and stores the specification information. The vehicle specification storage unit 20 may store the same standard specifications in a non-rewritable fixed area and in a rewritable update area, and may overwrite the standard specifications in the update area when the changed specification information is acquired.

The signal processing unit 22 performs a signal processing of each detection information acquired by the in-vehicle sensor 28. The signal processing unit 22 includes, for example, a plurality of signal processing units such as a sprung speed calculation processing unit 22a, . . . , and a stroke speed estimation processing unit 22n. For example, the sprung speed calculation processing unit 22a acquires a sprung acceleration from the acceleration sensor provided in the electronic control suspension device and calculates a sprung speed. In addition, the signal processing unit 22 can also calculate heave, roll, pitch speeds, and the like of the host vehicle 12 based on the calculated sprung speed. The signal processing unit 22 can also perform a processing for classifying into combinations (6 types) of sprung resonance and unsprung resonance for each of heave, roll, pitch of the host vehicle 12. In addition, for example, the stroke speed estimation processing unit 22n calculates an estimated value of a stroke speed of the suspension based on the sprung acceleration. For example, regarding the sprung speed calculation processing unit 22a and the stroke speed estimation processing unit 22n, when the changed specification information is provided from the management device 14 and the specifications stored in the vehicle specification storage unit 20 are updated, the sprung speed and a stroke speed estimation value are calculated using the changed specification information. In this case, a more accurate spring speed and stroke speed estimation value can be obtained according to the current state of the host vehicle 12.

When the updated specification information is acquired from the management device 14, the control unit 24 changes (updates or overwrites) the corresponding specification information currently stored in the vehicle specification storage unit 20, and reflects the changed specification information in the traveling control of the host vehicle 12. The control unit 24 includes, for example, a plurality of control units such as a riding comfort control unit 24a, . . . , and a large-amplitude shock reduction control unit 24n, and calculates various control values for controlling the electronic control suspension device using a result of the signal processing in the signal processing unit 22. For example, the riding comfort control unit 24a calculates a target control value for a sprung vibration damping control for improving the riding comfort based on a vehicle body speed acquired by processing the detection information acquired by the wheel speed sensor by the signal processing unit 22, the sprung speed, the heave, roll, and pitch speeds, the stroke speed estimation value, and the like acquired as a result of the calculation by the signal processing unit 22, and the latest specification information (including specification information when the specification information is updated and specification information when the specification information remains as the standard specifications) stored in the vehicle specification storage unit 20. In addition, for example, the large-amplitude shock reduction control unit 24n calculates a target control value for reducing a large-amplitude shock based on the vehicle body speed, the stroke speed estimation value, and the specification information. In each calculation in the signal processing unit 22, when the changed specification information is provided from the management device 14 and the specifications stored in the vehicle specification storage unit 20 is updated, various calculations are executed using the changed specification information. As a result, it is possible to calculate a more accurate target control value according to the current state of the host vehicle 12.

Here, the calculation of the target control value will be described. When the vehicle control system 10 according to the present embodiment is applied to control of the electronic control suspension device, so as to more appropriately control an attenuation coefficient or the like of the suspension by updating (rewriting) the control constant (the specification information) that has been previously used as the fixed value according to the traveling state, and to reduce input (vibration) to occupants of the host vehicle 12 as much as possible. As a result, the riding comfort is improved.

Figure 2:
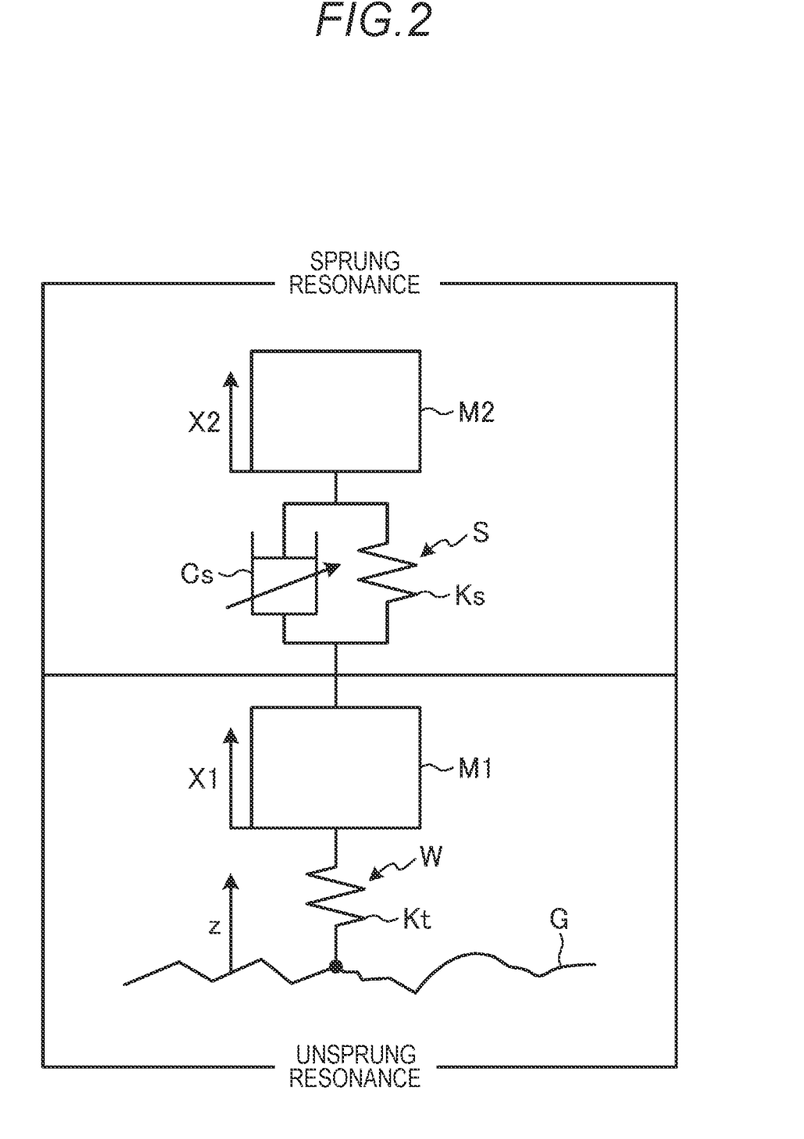
FIG. 2 is an exemplary and schematic diagram showing a suspension that can be controlled by the vehicle control system (the vehicle control device) according to the embodiment and a structure around the suspension.

For example, FIG. 2 is a single-wheel model of the electronic control suspension device, simulating unsprung and sprung parts of a tire W. In addition, at that time, an equation of motion of the sprung resonance is Equation 1, and an equation of motion of the unsprung resonance is Equation 2.

$$M_2 \frac{\partial x_2^2}{\partial t^2} = k_s(x_1 - x_2) + c_s\left(\frac{\partial x_1}{\partial t} - \frac{\partial x_2}{\partial t}\right) \quad \text{(Formula 1)}$$

$$M_1 \frac{\partial x_1^2}{\partial t^2} = k_s(x_1 - x_2) + c_s\left(\frac{\partial x_1}{\partial t} - \frac{\partial x_2}{\partial t}\right) + k_t(z - x_1) \quad \text{(Formula 2)}$$

In FIG. 2, G represents a road surface, M1 represents an unsprung weight (a weight of a component such as a suspension arm), M2 represents a sprung weight (a body weight of the host vehicle 12 or the like), and the tire W (an elastic body) is present between the road surface G and the unsprung part (the unsprung weight M1). Kt represents a tire characteristic. A displacement z represents a displacement (vibration amount) of the tire W. A suspension S (spring, shock absorber, damper, and the like) is present between the unsprung part (the unsprung weight M1) and the sprung part (the sprung weight M2). Cs represents an attenuation coefficient of the suspension S, and Ks represents a spring constant of the suspension S. X1 represents a displacement amount of the unsprung part, and X2 represents a displacement amount of the sprung part.

Figure 3:
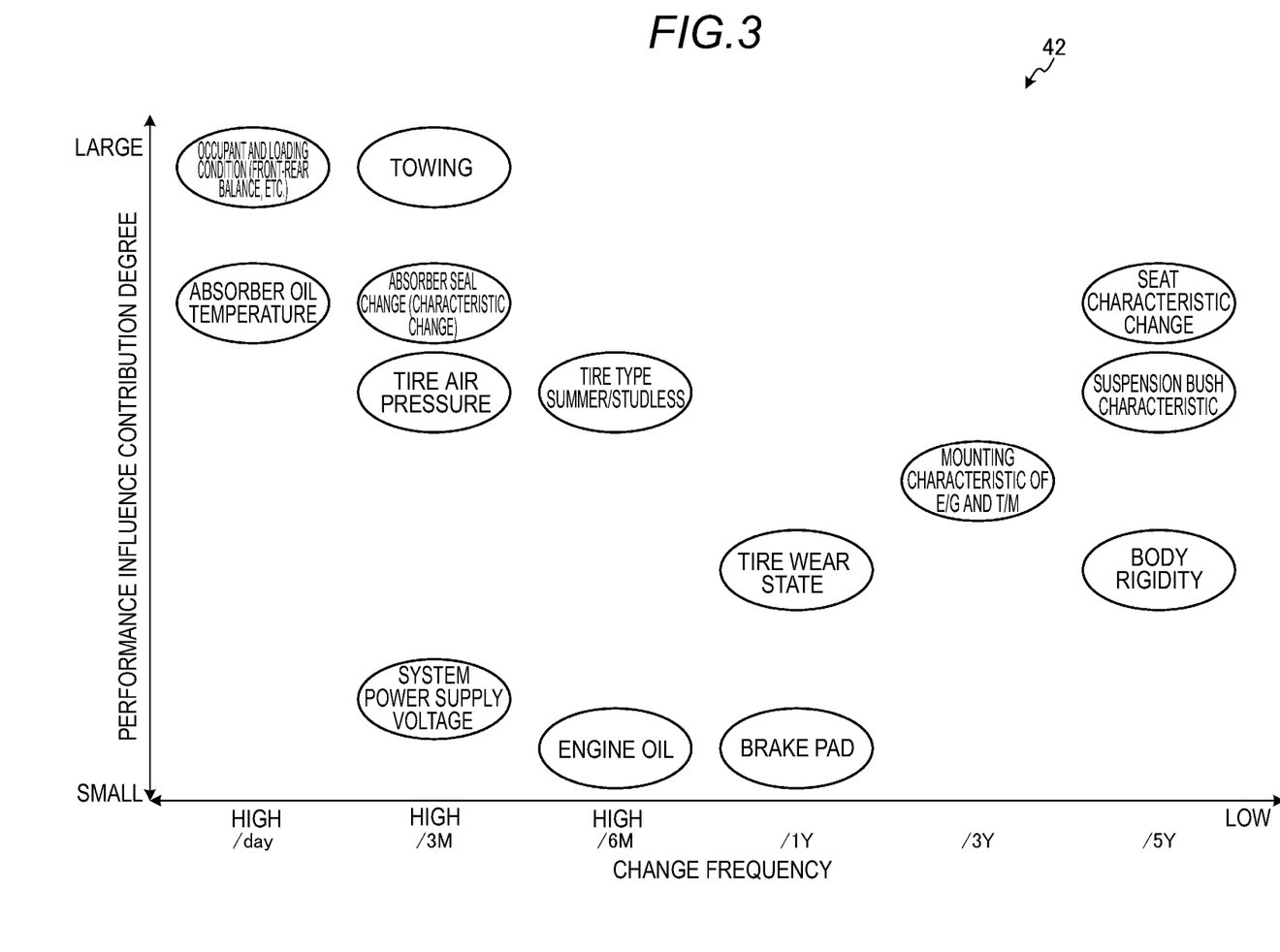
FIG. 3 is an exemplary explanatory diagram showing a relationship between a performance influence contribution degree and a change frequency of an influence factor on specification change regarding suspension control of the vehicle control system (the vehicle control device) according to the embodiment.

Here, a factor affecting a performance of the electronic control suspension device can be considered, for example, as shown in FIG. 3. FIG. 3 is an illustrative explanatory diagram 42 showing a relationship between a performance influence contribution degree and a change frequency of an influence factor on specification change regarding suspension control of the vehicle control system 10 (the vehicle control device 10A). Specific examples thereof include an occupant and loading condition (front-rear balance and the like), an absorber oil temperature of the suspension S, the presence or absence of towing, an absorber seal change (characteristic change), a tire air pressure, a system power supply voltage, a tire type (summer or studless), an engine oil, a tire wear state, a wear state of a brake pad, a mounting characteristic of an engine (E/G) and a transmission (T/M), a seat characteristic change, a suspension bush characteristic, a body rigidity, and the like. These factors are different from each other in the change frequency as shown in FIG. 3. For example, the occupant and loading condition can be changed from day to day because the number of occupants changes and the amount and weight of luggage to be loaded changes for each ride. Similarly, the absorber oil temperature can be changed depending on a daily traveling condition. In addition, the presence or absence of towing (connection to a towing vehicle) is switched, for example, during a leisure season, and can be changed at a frequency such as once every few months (for example, 3 months). Similarly, the tire air pressure or the like can be adjusted (changed) at a time of inspection once every few months (for example, 3 months). In addition, the tire type (summer or studless) can be replaced every six months. In addition, the tire wear state and the wear state of the brake pad can be reviewed on a yearly basis (for example, once per year). The mounting characteristic of the engine (E/G) and the transmission (T/M) can be reviewed in a longer period (for example, once per 3 years or 6 years).

As described above, elements shown in FIG. 3 use fixed values as the standard specifications to perform various calculations. Therefore, for example, the unsprung weight M1 and the sprung weight M2 are used as the fixed values even when the calculation is performed using the above Equations 1 and 2. As a result, as described above, it may be difficult to perform an expected control even if the road surface condition during traveling is taken into consideration when the target control value is calculated.

Figure 4:
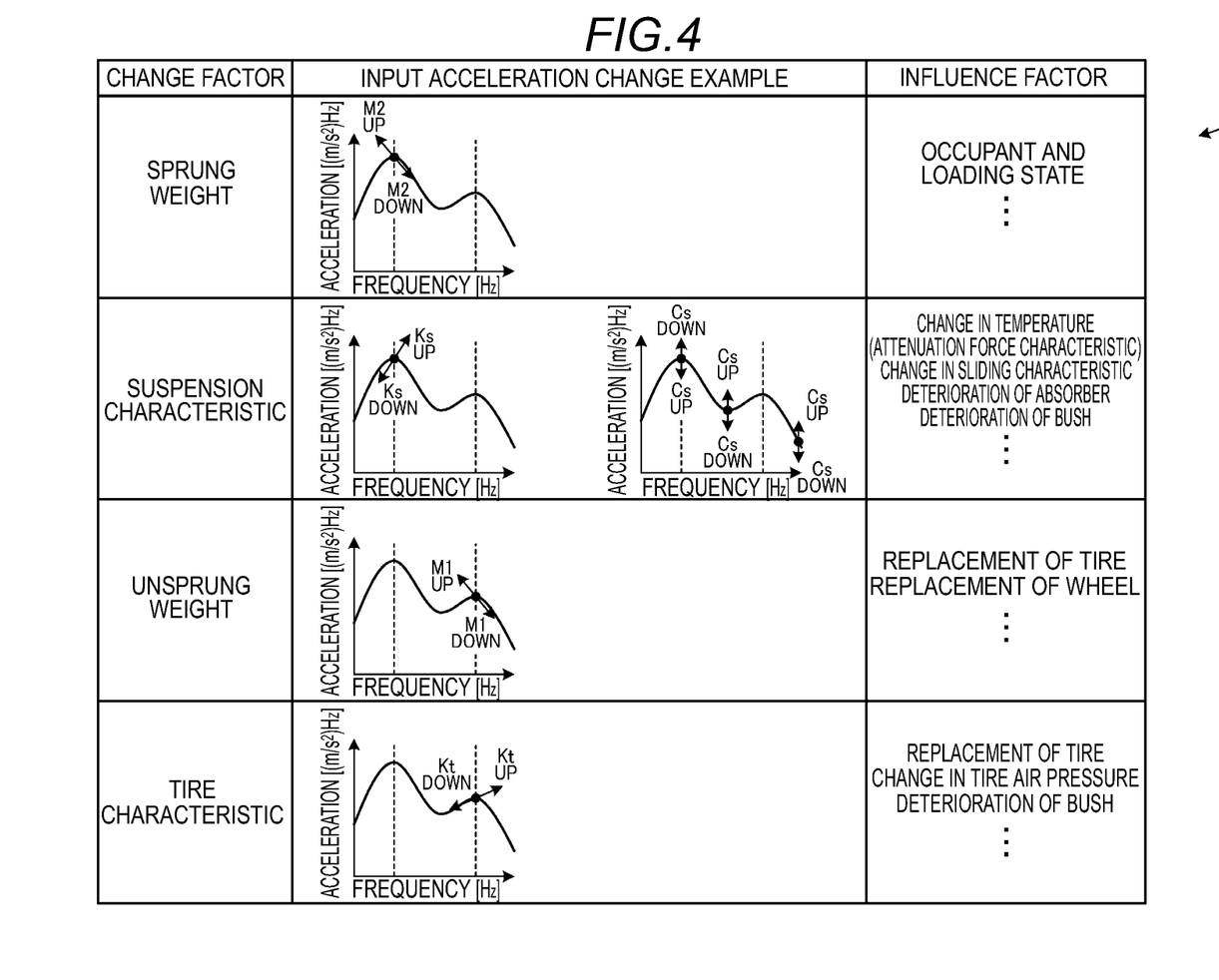
FIG. 4 is an exemplary diagram showing a relationship between a change factor of the specification change regarding the suspension control of the vehicle control system (the vehicle control device) according to the embodiment, an input acceleration change example, and the influence factor.

FIG. 4 is an exemplary relationship diagram 44 showing a relationship between a change factor of the specification change regarding the suspension control of the vehicle control system 10 (the vehicle control device 10A), an input acceleration change example, and the influence factor. As shown in FIG. 4, for example, the sprung weight M2 becomes UP or DOWN according to an occupant and loading state. As a result, an input acceleration of the in-vehicle sensor 28 of the host vehicle 12 fluctuates during traveling. Similarly, in suspension characteristics, the attenuation coefficient Cs of the suspension S and the spring constant Ks of the suspension S become UP or DOWN due to a change in temperature, a change in a sliding characteristic, deterioration of the absorber, deterioration of the bush, and the like. As a result, the input acceleration of the in-vehicle sensor 28 of the host vehicle 12 fluctuates during traveling. In addition, for example, the unsprung weight M1 becomes UP or DOWN due to replacement of the tire W, replacement of the wheel, and the like. As a result, the input acceleration of the in-vehicle sensor 28 of the host vehicle 12 fluctuates during traveling. Further, for example, the tire characteristic Kt becomes UP or DOWN due to replacement of the tire W, change in the tire air pressure, deterioration of the bush, and the like. As a result, the input acceleration of the in-vehicle sensor 28 of the host vehicle 12 fluctuates during traveling. Therefore, by comparing the past traveling state and the current traveling state on the "usually passing road", it is detected whether there is a change in the control constant (the specification information) that affects the traveling control of the host vehicle 12, and when a change exists, the control constant (the specification information) of the host vehicle 12 is updated. As a result, the target control value most suitable for a current vehicle state (traveling state) of the host vehicle 12 can be calculated.

Returning to FIG. 1, the output processing unit 26 outputs a target current that implements control of an actuator 32 (for example, a solenoid of the electronic control suspension device) based on various target control values calculated by the control unit 24. The output processing unit 26 includes, for example, a final target output calculation unit 26*a*, a current feedback unit 26*b*, and the like. The final target output calculation unit 26*a* calculates a final control value to be input to the actuator 32 of the electronic control suspension device based on the various target control values calculated by the control unit 24. That is, the final target output calculation unit 26*a* calculates the final control value that brings a vibration damping characteristic for the host vehicle 12 into an optimal state (a control value that minimizes a vibration input to the occupant riding in the host vehicle 12). The current feedback unit 26*b* calculates a current value to be actually provided to the actuator 32 at the present time based on a current value provided to the actuator 32 at the present time and the final control value calculated by the final target output calculation unit 26*a*, and drives the actuator 32.

On the other hand, as described above, the data accumulation unit 36 of the management device 14 sequentially stores the traveling information (the detection information (the traveling information) of the in-vehicle sensor 28 and the GPS reception unit 30 acquired by the acquisition unit 18) at the time of traveling of the host vehicle 12, which is transmitted from the transmission and reception unit 16 of the host vehicle 12, and constructs a dedicated database indicating the behavior (a vibration state or the like) of the host vehicle 12. That is, the data accumulation unit 36 constructs a database showing the vibration state obtained when the host vehicle 12 travels on the "usually passing road", for example, the road around the home. In this case, the traveling information may be stored in association with a traveling time of the host vehicle 12, date and time, weather, and the like. For example, when the traveling time and the date and time (season) are different, a congestion state may be different, or a traveling speed may be changed due to a difference in a surrounding brightness and the road surface state (dry, wet, frozen, and the like). In such a case, the traveling speed on the "usually passing road" may change, which may cause a different behavior of the electronic control suspension device. Therefore, by considering the traveling time of the host vehicle 12, the date and time, the weather, and the like, it is possible to grasp the traveling state of the host vehicle 12 with higher accuracy.

The abnormality detection unit 38 compares (for example, calculates a difference between) the current traveling information (first traveling information) of the host vehicle 12 received by the transmission and reception unit 34 from the vehicle control device 10A with accumulated information (second traveling information) that is accumulated in the data accumulation unit 36 and corresponds to the first traveling information in a case where the host vehicle 12 has previously traveled at the same position (the same position on the usually passing road). The second traveling information may be traveling information obtained when the host vehicle 12 travels on the "usually passing road" last time, or may be an average value of traveling information obtained when the host vehicle 12 has previously traveled. When a difference equal to or greater than a predetermined threshold value exists between the first traveling information and the second traveling information, the abnormality detection unit 38 performs abnormality determination that a change has occurred in a control constant (specifications) that affects the traveling control of the host vehicle 12 (an abnormality may occur in the calculation of the target control value). When the difference between the first traveling information and the second traveling information is less than the predetermined threshold value, the abnormality detection unit 38 determines that no change exists in the specifications that affect the traveling control of the host vehicle 12. That is, the specification information of the host vehicle 12 is not updated, and the current state is maintained.

An example of a processing flow of the vehicle control system 10 configured as described above will be illustrated with reference to a flowchart of FIG. 5.

For example, when the vehicle control device 10A determines that the host vehicle 12 is traveling on the "usually passing road", for example, the road around the home, based on the position information based on the GPS signal acquired by the GPS reception unit 30 (Yes in S100), the vehicle control device 10A acquires detection information (for example, the acceleration information) showing the traveling state of the host vehicle 12 via the in-vehicle sensor 28. The traveling information in which the detection information and the position information acquired by the GPS reception unit 30 are associated with each other is sequentially transmitted to the management device 14 (the transmission and reception unit 34) via the transmission and reception unit 16 (S102). When the management device 14 receives the traveling information from the host vehicle 12 (the vehicle control device 10A), the management device 14 sequentially accumulates the traveling information in the data accumulation unit 36 and updates the database (S104). That is, the management device 14 constructs a dedicated database regarding the traveling information for the host vehicle 12 traveling on the "usually passing road".

The management device 14 compares the traveling information from the vehicle control device 10A (the host vehicle 12) (the first traveling information that is the current traveling information of the host vehicle 12) with the second traveling information obtained when the host vehicle 12 has previously traveled at the same position, accumulated in the data accumulation unit 36, and corresponding to the first traveling information (S106). When the difference between the first traveling information and the second traveling information is equal to or greater than the predetermined threshold value, that is, when a change equal to or greater than the threshold value exists in the traveling state even though the host vehicle 12 is traveling on the "usually passing road" as usual (Yes in S106), it is determined as necessary to change the specifications that affect the traveling control of the host vehicle 12. The changed specification calculation unit 40 calculates the control constant (the specification information) of the host vehicle 12 such that the difference between the first traveling information and the second traveling information becomes less than the threshold value (S108). That is, the changed specification calculation unit 40 calculates the changed specification information.

When the changed specification information is calculated by the changed specification calculation unit 40, the transmission and reception unit 34 transmits the changed specification information to the transmission and reception unit 16 of the vehicle control device 10A (the host vehicle 12) (S110). When the vehicle control device 10A receives the changed specification information, the vehicle control device 10A updates the previous specification information stored in the vehicle specification storage unit 20 with the changed specification information (S112). The signal processing unit 22 and the control unit 24 use the changed specification information to calculate the target control value that is intended for a control effect by the electronic control suspension device, that is, a minimum vibration input to the occupant riding in the host vehicle 12, and execute the control of the electronic control suspension device of the host vehicle 12 (S114).

As compared with the case where the calculation is performed using the fixed value in the related art, it is possible to more effectively prevent the vibration of the electronic control suspension device, and it is possible to further improve the riding comfort of the host vehicle 12.

In the processing of S106, when the difference between the first traveling information and the second traveling information is less than the threshold value (No in S106), the processing of S108 to S112 is skipped. That is, the specification information in the vehicle specification storage unit 20 of the vehicle control device 10A (the host vehicle 12) is not updated, and the current state is maintained. That is, the specification information of the host vehicle 12 is optimal at present, and the vibration damping control of the electronic control suspension device is regarded as being fully functioning. In S100, when the host vehicle 12 is traveling on a place other than the "usually passing road", the processing of S102 to S112 is skipped, the specification information is not updated, and the current state is maintained. In this case, it can be considered that the host vehicle 12 travels on the "usually passing road" when departing from the home. That is, the specification information of the host vehicle 12 is updated to the specification information suitable for the current number of occupants, the amount of luggage, a state of the tire W, and the like of the host vehicle 12 when the host vehicle 12 travels on the "usually passing road". Therefore, the electronic control suspension device of the host vehicle 12 can perform the vibration damping control (traveling control) in an optimal state even after the host vehicle 12 travels on the "usually passing road", and can improve the riding comfort of the host vehicle 12.

According to the vehicle control system 10 according to the present embodiment, the traveling control of the host vehicle 12 can be further optimized by updating the specification information as appropriate.

Figure 5:
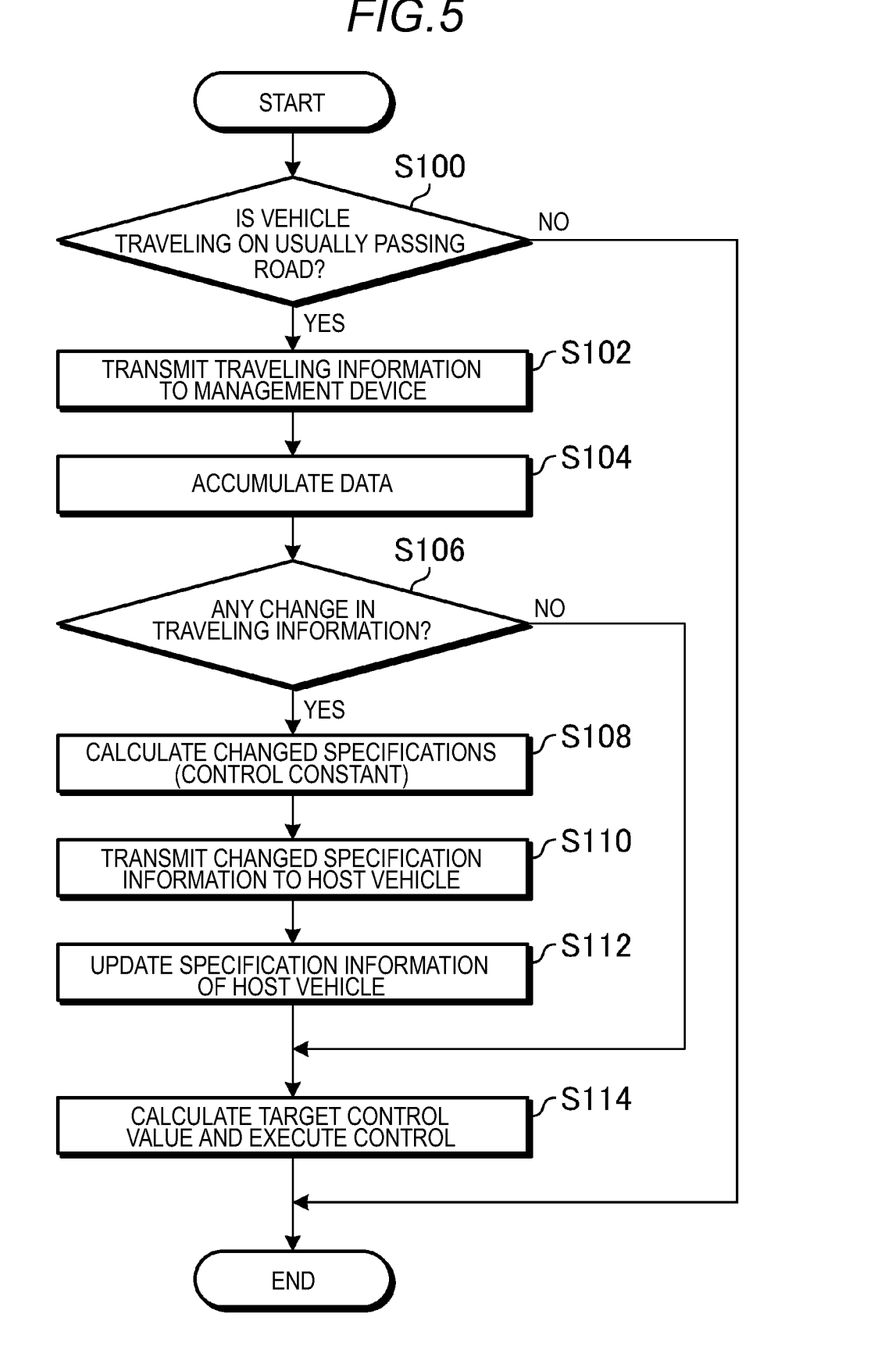
FIG. 5 is an exemplary flowchart illustrating a processing flow of the vehicle control system according to the embodiment.

Although the flowchart of FIG. 5 is executed at a predetermined control cycle, by shortening the control cycle and increasing an update frequency of the specification information, a consideration condition (element) in original calculation of the target control amount can be narrowed down within a certain range. As a result, robustness for control is enhanced, and the control effect can be further enhanced.

Among the elements shown in FIG. 3, except for the change in the occupant and loading condition and the change in the tire type, for the change in the temperature and the change in the air pressure, as described above, the changed specification calculation unit 40 calculates the control constant (the specification information) of the host vehicle 12 such that the difference between the first traveling information and the second traveling information is less than the threshold value. That is, the changed specification calculation unit 40 calculates a control constant that covers the changes based on the plurality of elements. On the other hand, when the occupant and loading condition changes, when the tire type changes, and the like, the specification information of the host vehicle 12 may be changed by calculating the specification information in numbers while regarding such changes as changes in the sprung weight M2 and the unsprung weight M1. In addition, according to the above embodiment, the control constant is calculated by comprehensively handling the change in the temperature and the change in the air pressure, but in another embodiment, the changes in individual elements may be detected by the respective in-vehicle sensors 28 and transmitted to the management device 14 to update individual specification information corresponding to each element. In this case, the state of the host vehicle 12 can be grasped with higher accuracy, and more accurate vehicle control can be performed.

In the case of the system for updating the specification information as described above, as shown in FIG. 3, the factors that affect the performance of the electronic control suspension device have various update frequencies. Therefore, when a service for updating the specification information is provided for a fee, the service may be provided with different charge systems. For example, as shown in a relationship diagram 46 in FIG. 6, based on the performance influence contribution degree of the host vehicle 12 and a predetermined change frequency, the specification information may be classified into a first acquisition mode (a service mode of a subscription area 46a) in which the changed specification information is acquirable at a fixed price for a certain period of time, and a second acquisition mode (a service mode of a pay-as-you-go area 46b) in which an acquisition fee is charged each time the changed specification information is acquired. For example, an element that changes relatively frequently (an element that changes every day to per 3 months) has a flat-rate system (subscription mode), and thus the specification information can be updated sequentially. On the other hand, when the element changes in a relatively long cycle (for example, six months or more), the specification information may be updated according to the state of the host vehicle 12, for example, at each time of regular inspection or the like. As a result, for example, it is possible to acquire the specification information appropriate for the host vehicle 12 more efficiently and at an appropriate timing, and it is possible to provide a specification information update service that is easy to use.

Figure 6:
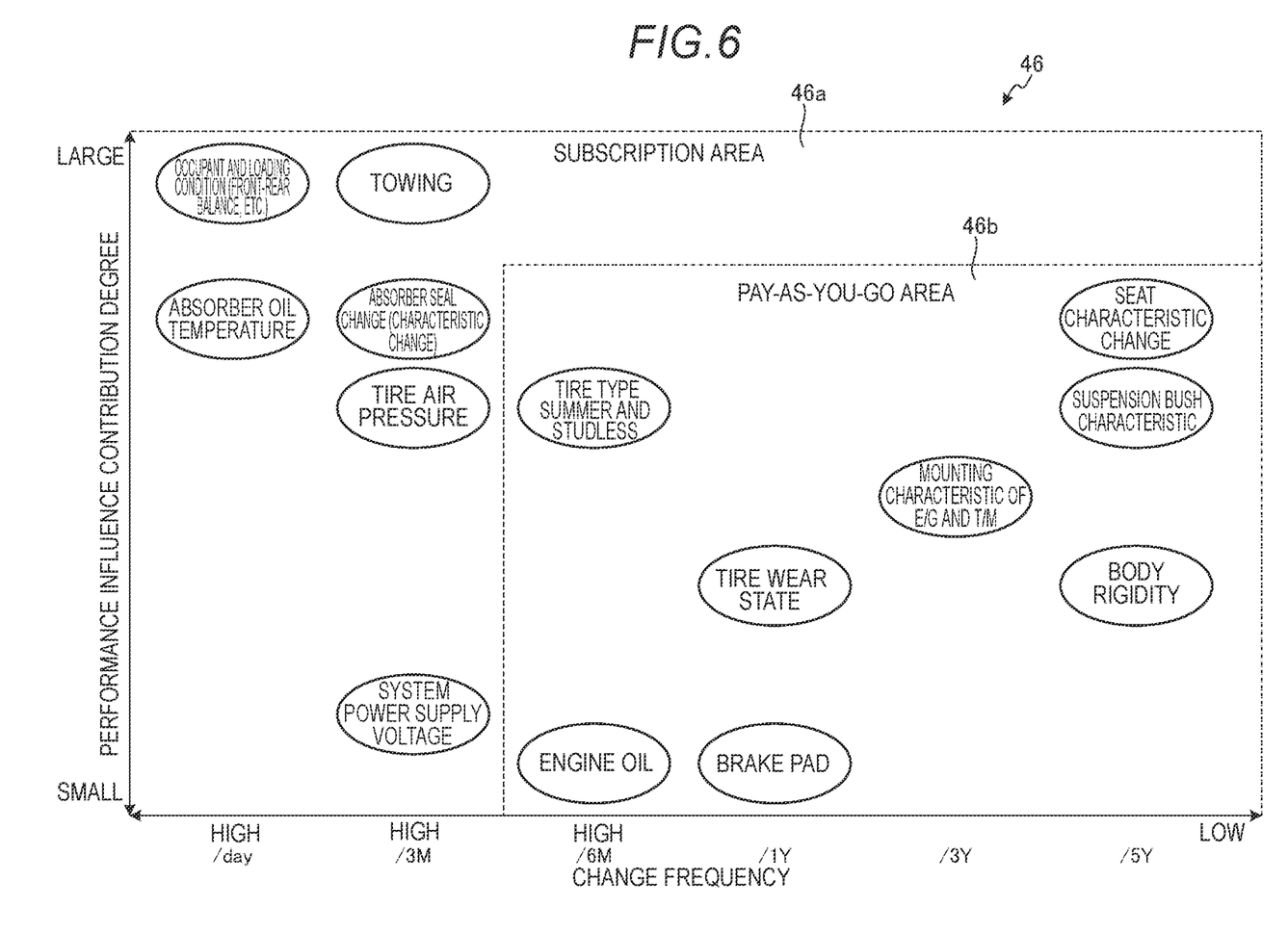
FIG. 6 is an exemplary diagram showing a provision mode (billing mode) when specifications of the vehicle control system (the vehicle control device) according to the embodiment are changed.

In FIG. 6, when the tire is replaced with a new tire (for example, when a maintenance condition of the host vehicle 12 (a maintenance condition of the tire) satisfies a predetermined condition (for example, replacement with the new tire)), the tire characteristic Kt decreases as compared with a case of an old tire in which the tire characteristic (spring constant) Kt is increased due to deterioration over time such as volume decrease due to wear of rubber, curing of rubber, and the like. As a result, a resonance frequency of the unsprung weight M1 is lowered, and an input for riding over a protrusion is reduced. In this case, by using the standard specifications determined at the time of design as the specification information, vibration can be prevented as designed.

Figure 7:
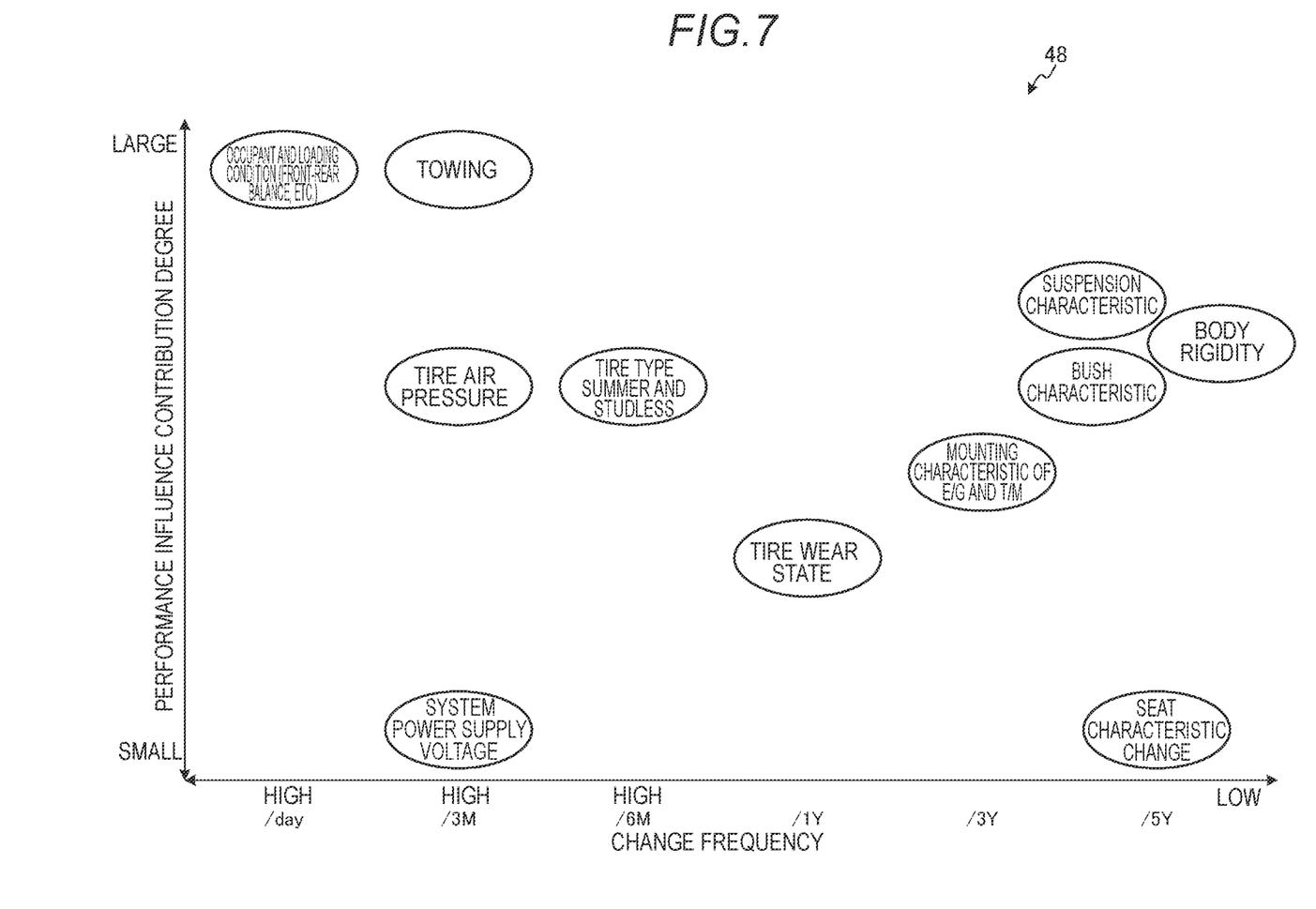
FIG. 7 is an exemplary explanatory diagram showing a relationship between a performance influence contribution degree and a change frequency of an influence factor on specification change regarding a rear steering control of the vehicle control system (the vehicle control device) according to the embodiment.

The above-described embodiment shows the case where the control target of the vehicle control system 10 is the electronic control suspension device. In another embodiment, for example, the control target of the vehicle control system 10 may be a rear steering system, and the specification information regarding the rear steering system may be sequentially updated based on a change in the traveling information of the host vehicle 12. In this case, the specification information may be first specifications used for calculating a required yaw rate of the rear steering or a required lateral acceleration of the rear steering in the rear steering system of the vehicle and second specifications used for calculating a required rear wheel steering angle. As a result, it is possible to contribute to the improvement of the traveling control of the host vehicle 12 as in the above-described embodiment. For example, it is possible to contribute to the improvement of the riding comfort and the improvement of the turning stability. In this case, a relationship between a performance influence contribution degree and a change frequency of an influence factor on a specification change of the rear steering system in the vehicle control system 10 (vehicle control device 10A) is as shown in an explanatory diagram 48 shown in FIG. 7, and can achieve the same effect as in a case of being applied to the electronic control suspension device.

Although the embodiment and modification disclosed here are described, such embodiment and modification are presented as examples, and are not intended to limit the scope disclosed here. Such new exemplary embodiments can be implemented in other various forms, and various omissions, replacements, and changes can be made without departing from the spirit disclosed here. The accompanying claims and their equivalents are intended to cover such embodiment or modification as would fall within the scope and spirit disclosed here.

According to an aspect of this disclosure, a vehicle control device includes, for example: an acquisition unit configured to acquire detection information in a current traveling state detected by a detection unit mounted on a vehicle provided with the vehicle control device and position information indicating a current position of the vehicle; a transmission unit configured to transmit traveling information in which the acquired detection information and the acquired position information are associated with each other to an external management device; a reception unit configured to receive changed specification information of the vehicle that is transmitted when the management device determines that specifications of the vehicle that affect traveling control of the vehicle need to be changed with respect to the current traveling state of the vehicle; and a control unit configured to, when the specification information is received, change the specifications of the vehicle corresponding to the specification information and reflect the changed specifications in the traveling control of the vehicle. The specification information includes specifications that are changed based on comparison between first traveling information that is current traveling information of the vehicle and second traveling information obtained when the vehicle has previously traveled at a same position, accumulated in the management device, and corresponding to the first traveling information. According to this configuration, for example, the specifications of the vehicle can be changed based on the current traveling state of the vehicle, and thus the traveling control of the vehicle can be further optimized.

According to another aspect of this disclosure, the specification information includes, for example, specifications changed such that a difference between the first traveling information and the second traveling information that is equal to or greater than a predetermined threshold value becomes less than the predetermined threshold value. According to this configuration, for example, it is possible to provide the vehicle with the changed specifications of the vehicle more efficiently and appropriately.

According to another aspect of this disclosure, the specification information includes, for example, at least first specifications to be used for calculating a sprung speed of a suspension of the vehicle and second specifications to be used for calculating a stroke speed of the suspension. According to this configuration, for example, vibration damping control of the suspension can be performed more accurately.

According to another aspect of this disclosure, the specification information is acquirable, for example, while being classified into a first acquisition mode in which the specification information is acquirable at a fixed price for a certain period of time and a second acquisition mode in which an acquisition fee is charged each time the specification information is acquired, based on a performance influence contribution degree to the vehicle and a predetermined change frequency. According to this configuration, for example, the specifications appropriate for the vehicle can be obtained more efficiently.

According to another aspect of this disclosure, the specification information includes, for example, standard specifications determined at a time of design of the vehicle as the changed specification information when a maintenance condition of the vehicle satisfies a predetermined condition. According to this configuration, for example, in a case where the specification information is changed due to wear of a component of the vehicle or the like, the specification information is once returned to the standard specifications when a cause of wear or the like is resolved by maintenance of the vehicle or replacement of the component (including a tire or the like). As a result, it is possible to more accurately change the specification information based on the subsequent traveling condition of the vehicle or the like.

According to another aspect of this disclosure, a vehicle control system includes, for example: a vehicle control device configured to be provided in a vehicle and manage specifications used for traveling control of the vehicle in a changeable manner; and a management device configured to be provided outside the vehicle, transmit and receive information to and from the vehicle, accumulate the information acquired from the vehicle, and manage the specifications of the vehicle based on the information. The vehicle control device includes: an acquisition unit configured to acquire detection information in a current traveling state detected by a detection unit mounted on the vehicle and position information indicating a current position of the vehicle; a transmission unit configured to transmit traveling information in which the acquired detection information and the acquired position information are associated with each other to the management device; a reception unit configured to receive changed specification information of the vehicle that is transmitted when the management device determines that the specifications of the vehicle that affects the traveling control of the vehicle need to be changed with respect to the current traveling state of the vehicle; and a control unit configured to, when the specification information is received, change the specifications of the vehicle corresponding to the specification information and reflect the changed specifications in the traveling control of the vehicle The management device includes: a reception unit configured to receive the traveling information transmitted from the vehicle; a data accumulation unit configured to accumulate the received traveling information; a changed specification calculation unit configured to calculate specifications that are changed based on comparison between first traveling information that is current traveling information of the vehicle and second traveling information obtained when the vehicle has previously traveled at a same position, accumulated in the management device, and corresponding to the first traveling information; and a transmission unit configured to transmit the changed specification information of the vehicle to the vehicle. According to this configuration, for example, the specifications of the vehicle can be changed based on the current traveling state of the vehicle, and thus the traveling control of the vehicle can be further optimized.

According to another aspect of this disclosure, the changed specification calculation unit calculates the specifications changed such that a difference between the first traveling information and the second traveling information that is equal to or greater than a predetermined threshold value becomes less than the predetermined threshold value.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle control device, comprising: an acquisition unit configured to acquire detection information in a current traveling state detected by a detection unit mounted on a vehicle provided with the vehicle control device and position information indicating a current position of the vehicle;
    a transmission unit configured to transmit traveling information in which the acquired detection information and the acquired position information are associated with each other to an external management device configured to be provided outside the vehicle;
    a reception unit configured to receive changed specification information of the vehicle that is transmitted when the management device determines that specifications of the vehicle that affect traveling control of the vehicle need to be changed with respect to the current traveling state of the vehicle; and
    a control unit configured to, when the changed specification information is received by the reception unit, change the specifications of the vehicle corresponding to the changed specification information and reflect the changed specifications in the traveling control of the vehicle, wherein
        the changed specification information includes specifications that are changed based on comparison between first traveling information that is current traveling information of the vehicle and second traveling information obtained when the vehicle has previously traveled at a same position, accumulated in the management device, and corresponding to the first traveling information.

2. The vehicle control device according to claim 1, wherein
    the changed specification information includes specifications changed such that a difference between the first traveling information and the second traveling information that is equal to or greater than a predetermined threshold value becomes less than the predetermined threshold value.

3. The vehicle control device according to claim 1, wherein
    the changed specification information includes at least first specifications to be used for calculating a sprung speed of a suspension of the vehicle and second specifications to be used for calculating a stroke speed of the suspension.

4. The vehicle control device according to claim 1, wherein
    the changed specification information is acquirable while being classified into a first acquisition mode in which the changed specification information is acquirable at a fixed price for a certain period of time and a second acquisition mode in which an acquisition fee is charged each time the changed specification information is acquired, based on a performance influence contribution degree to the vehicle and a predetermined change frequency.

5. The vehicle control device according to claim 1, wherein
    the specifications include standard specifications determined at a time of design of the vehicle as the changed specification information when a maintenance condition of the vehicle satisfies a predetermined condition.

6. A vehicle control system, comprising:
    a vehicle control device configured to be provided in a vehicle and manage specifications used for traveling control of the vehicle in a changeable manner; and
    a management device configured to be provided outside the vehicle, transmit and receive information to and from the vehicle, accumulate the information acquired from the vehicle, and manage the specifications of the vehicle based on the information,
    wherein the vehicle control device includes:
    an acquisition unit configured to acquire detection information in a current traveling state detected by a detection unit mounted on the vehicle and position information indicating a current position of the vehicle;
    a transmission unit configured to transmit traveling information in which the acquired detection information and the acquired position information are associated with each other to the management device;
    a reception unit configured to receive changed specification information of the vehicle that is transmitted when the management device determines that the specifications of the vehicle that affects the traveling control of the vehicle need to be changed with respect to the current traveling state of the vehicle; and
    a control unit configured to, when the changed specification information is received by the reception unit, change the specifications of the vehicle corresponding to the changed_specification information and reflect the changed specifications in the traveling control of the vehicle, and the management device includes:
- a reception unit configured to receive the traveling information transmitted from the vehicle;
- a data accumulation unit configured to accumulate the received traveling information;
- a changed specification calculation unit configured to calculate specifications that are changed based on comparison between first traveling information that is current traveling information of the vehicle and second traveling information obtained when the vehicle has previously traveled at a same position, accumulated in the management device, and corresponding to the first traveling information; and
- a transmission unit configured to transmit the changed specification information of the vehicle to the vehicle.

7. The vehicle control system according to claim 6, wherein the changed specification calculation unit calculates the specifications changed such that a difference between the first traveling information and the second traveling information that is equal to or greater than a predetermined threshold value becomes less than the predetermined threshold value.

* * * * *